United States Patent
Berning et al.

(10) Patent No.: US 6,763,404 B2
(45) Date of Patent: Jul. 13, 2004

(54) SYSTEM AND METHOD FOR SCHEDULING OF RANDOM COMMANDS TO MINIMIZE IMPACT OF LOCATIONAL UNCERTAINTY

(75) Inventors: Lynn Charles Berning, Rochester, MN (US); David Robison Hall, Rochester, MN (US); Anthony Edwin Welter, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 530 days.

(21) Appl. No.: 09/916,029

(22) Filed: Jul. 26, 2001

(65) Prior Publication Data

US 2003/0023778 A1 Jan. 30, 2003

(51) Int. Cl.[7] ............................................. G06F 12/00
(52) U.S. Cl. ..................... 710/40; 710/39; 711/111; 711/112; 711/151
(58) Field of Search .............................. 710/6, 39, 40, 710/310; 711/111, 112, 151, 158, 167

(56) References Cited

U.S. PATENT DOCUMENTS

| | | | | |
|---|---|---|---|---|
| 5,483,641 A | * | 1/1996 | Jones et al. ................. | 710/3 |
| 6,571,298 B1 | * | 5/2003 | Megiddo ..................... | 710/5 |
| 6,574,676 B1 | * | 6/2003 | Megiddo ..................... | 710/5 |
| 6,604,178 B1 | * | 8/2003 | Hall .............................. | 711/167 |
| 6,681,289 B2 | * | 1/2004 | Espeseth et al. ............ | 711/112 |

* cited by examiner

*Primary Examiner*—Jeffrey Gaffin
*Assistant Examiner*—Harold Kim
(74) *Attorney, Agent, or Firm*—Joan Pennington (57) ABSTRACT

A system and method are provided for hard disk drive command queue ordering with locational uncertainty of commands. For each command in the hard disk drive command queue, an expected access time is calculated utilizing a probability distribution for a currently executing command and a probability distribution for a candidate command. A command in the hard disk drive command queue having a minimum calculated expected access time is identified. Then the identified command having a minimum calculated expected access time is executed. The probability distribution for a currently executing command represents an ending location distribution for the currently executing command. The probability distribution for a candidate command represents a starting location distribution for the candidate command. For an estimated seek time of less than a time for one full revolution, a probability of a miss multiplied by a time of one extra revolution and multiplied by a candidate arrival probability is calculated and the result is added to an estimated seek time to provide the expected access time. For an estimated seek time of greater than a time for one full revolution, a probability of a make multiplied by a time of one extra revolution and multiplied by a candidate arrival probability is calculated and the result is subtracted from an estimated seek time to provide the expected access time.

18 Claims, 9 Drawing Sheets

ARRIVAL BANDS (SIDs) 130

| | 0-2 | 0-2 | 3-5 | 3-5 | 6-8 | 6-8 | 9 | 9 |
|---|---|---|---|---|---|---|---|---|
| SEEK DISTANCE (CYLINDER GROUPS) 132 | MAKE | MISS | MAKE | MISS | MAKE | MISS | MAKE | MISS |
| 0-30 | 4 | 2 | 9 | 0 | 4 | 0 | 72 | 6 |
| 31-91 | 4 | 1 | 6 | 0 | 2 | 0 | 98 | 5 |
| 92-182 | 9 | 7 | 5 | 0 | 4 | 0 | 150 | 4 |
| 183-303 | 27 | 5 | 13 | 1 | 15 | 1 | 208 | 4 |
| 304-454 | 36 | 5 | 16 | 1 | 14 | 4 | 236 | 11 |
| 455-635 | 21 | 10 | 8 | 7 | 15 | 6 | 224 | 14 |
| 636-846 | 23 | 11 | 18 | 2 | 14 | 2 | 153 | 8 |
| 847-1087 | 42 | 13 | 14 | 3 | 10 | 2 | 173 | 6 |
| 1088-1358 | 42 | 13 | 18 | 3 | 17 | 2 | 221 | 8 |
| 1359-1559 | 62 | 19 | 26 | 3 | 30 | 3 | 238 | 7 |
| 1560-1990 | 67 | 25 | 22 | 1 | 22 | 2 | 163 | 3 |

SYSTEM AND METHOD FOR SCHEDULING OF RANDOM COMMANDS TO MINIMIZE IMPACT OF LOCATIONAL UNCERTAINTY

FIELD OF THE INVENTION

The present invention relates generally to the data processing field, and more particularly, relates to a system and method for scheduling hard disk drive random commands with locational uncertainty.

DESCRIPTION OF THE RELATED ART

In random access storage devices, such as hard disk drives, when there are more than one command to execute, the data to be accessed next is chosen from a list or a queue of outstanding commands. The hard disk drive includes firmware performing a scheduling algorithm to determine the optimal command execution order. In general, the goal of the scheduling algorithm is to minimize the average access time for its commands. Presently, hard disk drives use a Shortest-Access Time First (SATF) algorithm.

The conventional SATF algorithm works as follows: Given a set of commands in a queue, a command is chosen that can be started or accessed first. This calculation has two parts, the time to perform the seek and settle operation from the current cylinder to the target cylinder and the latency between this point and when the starting sector for the command is reached. The SATF algorithm depends on accurate estimates of this access time. If the estimate is too low, the actuator may settle on track after the desired sector has already passed rotationally. This is called a miss. A miss adds one full revolution to the access time, degrading performance. If the access time estimate is too high, the optimal command candidate is not chosen for execution.

To implement a SATF algorithm, the latency between the current position and the target position must be analyzed. The command having the shortest access time and an acceptable probability of success is chosen by the algorithm. The probability of success is the probability that the command will be executed in the expected amount of time without one or more missed revolutions.

One problem with the typical SATF algorithm is that each command in the queue is classified in a binary manner. Desirable candidates are determined to be either reachable or unreachable in a given number of revolutions. Unfortunately, due to the large number of external factors affecting actual seek performance binary decisions are inadequate. To implement a SATF algorithm, the latency between the current position and the target position must be analyzed. The command having the shortest access time and an acceptable probability of success is chosen by the algorithm. The probability of success is the probability that the command will be executed in the expected amount of time without one or more missed revolutions. Using the probability of success to calculate an expected value is preferred.

One underlying assumption made with all SATF algorithms is that both the last sector of the current command and the first sector of the candidate command can be accurately determined. If the last sector of the current command and the first sector of the candidate command are not known, the latency between commands cannot be accurately determined and thus the access time cannot be accurately calculated. In the normal case of command scheduling, the next command to execute must be chosen before the completion of the current command. Otherwise, the average command time for a given set of commands would increase by the time required to sort the commands. Thus, given the timing of the sort and locational uncertainty for target commands, both the ending location of the current command and the starting location of each candidate command are unknown.

There are a number of potential applications where locational uncertainty are introduced, but for which a substantial competitive advantage could be obtained. This competitive advantage can only be realized however, if the performance impact of not knowing the exact starting location of a command can be minimized.

Examples of features that provide significant competitive advantage but at the cost of locational uncertainty include compression and a file system on a disk. Nearly any variable-bit rate compression scheme introduces locational uncertainty. An approximate location is determined, and the actual location of the data identified when the data is actually read. Since the exact location is determined after the seek has been completed; only the estimated location is available at the time command scheduling is done. In the file system on a disk, information regarding the location of a section of data could be stored on the disk, rather than being stored in random access memory (RAM). Then an approximate location is determined, the file system data is read and the actual location of the data identified. Given the potential gain from these and other features, as well as the potential performance impacts, a way to minimize the performance impact of locational uncertainty is needed.

A need exists for an improved system and method for hard disk drive random command queue ordering to minimize the performance impact of locational uncertainty of commands.

SUMMARY OF THE INVENTION

A principal object of the present invention is to provide an improved system and method for hard disk drive random command queue ordering. Other important objects of the present invention are to provide such system and method for hard disk drive command queue ordering that efficiently and effectively facilitates hard disk drive command queue ordering while minimizing the performance impact of locational uncertainty of commands and enabling expected access time accuracy; to provide such system and method for hard disk drive command queue ordering substantially without negative effect and that overcome many of the disadvantages of prior art arrangements.

In brief, a system and method are provided for hard disk drive command queue ordering with locational uncertainty of commands. For each candidate command in the hard disk drive command queue, an expected access time is calculated utilizing a probability distribution for a candidate command. A command in the hard disk drive command queue having a minimum calculated expected access time is identified. Then the identified command having a minimum calculated expected access time is executed.

In accordance with features of the invention, a probability distribution for a currently executing command represents an ending location distribution for the currently executing command. The probability distribution for a candidate command represents a starting location distribution for the candidate command. For an estimated seek time of less than a time for one full revolution, a probability of a miss multiplied by a time of one extra revolution and multiplied by a candidate arrival probability is calculated and the result is added to an estimated seek time to provide the expected access time. For an estimated seek time of greater than a time for one full revolution, a probability of a make multiplied by a time of one extra revolution and multiplied by a candidate arrival probability is calculated and the result is subtracted from an estimated seek time to provide the expected access time.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1A:
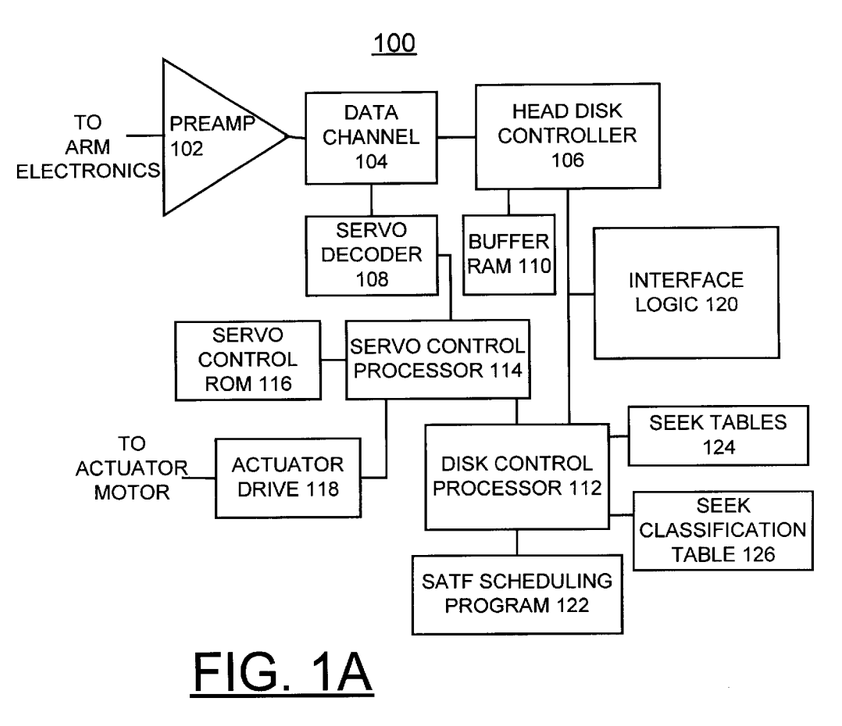
FIG. 1A is a block diagram representation illustrating a disk file system for implementing methods for implementing hard disk drive command queue ordering in accordance with the preferred embodiment.

Having reference now to the drawings, in FIG. 1A, there is shown a disk file system for carrying out the scheduling method of the preferred embodiment generally designated by the reference character 100. Servo information and customer data are amplified by a preamplifier (preamp) 102. A data channel 104 uses sampling techniques for detecting the readback signals from the disk surfaces that contain the customer data. A head disk controller 106 is coupled to the data channel 104. A servo decoder 108 coupled to the data channel 104 provides a servo timing signal to the head disk controller 106. A buffer random access memory 120 is coupled to the head disk controller 106. A disk control processor 112 is coupled to the head disk controller 106 and to a servo control processor 114. A servo control read only memory (ROM) 116 and an actuator drive 118 are coupled to the servo control processor 114. The servo control processor 114 performs servo control functions providing servo positioning control signals to the actuator driver 118 that is coupled to an actuator motor assembly (not shown). An interface logic 120 coupled to the head disk controller 106 and the disk control processor 112 performs interface logic functions. Scheduling data accesses is provided with a shortest access time first (SATF) scheduling program 122 of the preferred embodiment coupled to the disk control processor 112. Seek tables 124 and a seek classification table 126 of the preferred embodiment utilized by the SATF scheduling program 122 are coupled to the disk control processor 112. Disk control processor unit 112 is suitably programmed to execute the flow charts of FIGS. 2A, 2B, 2C, and 2D of the preferred embodiment.

Figure 1B:
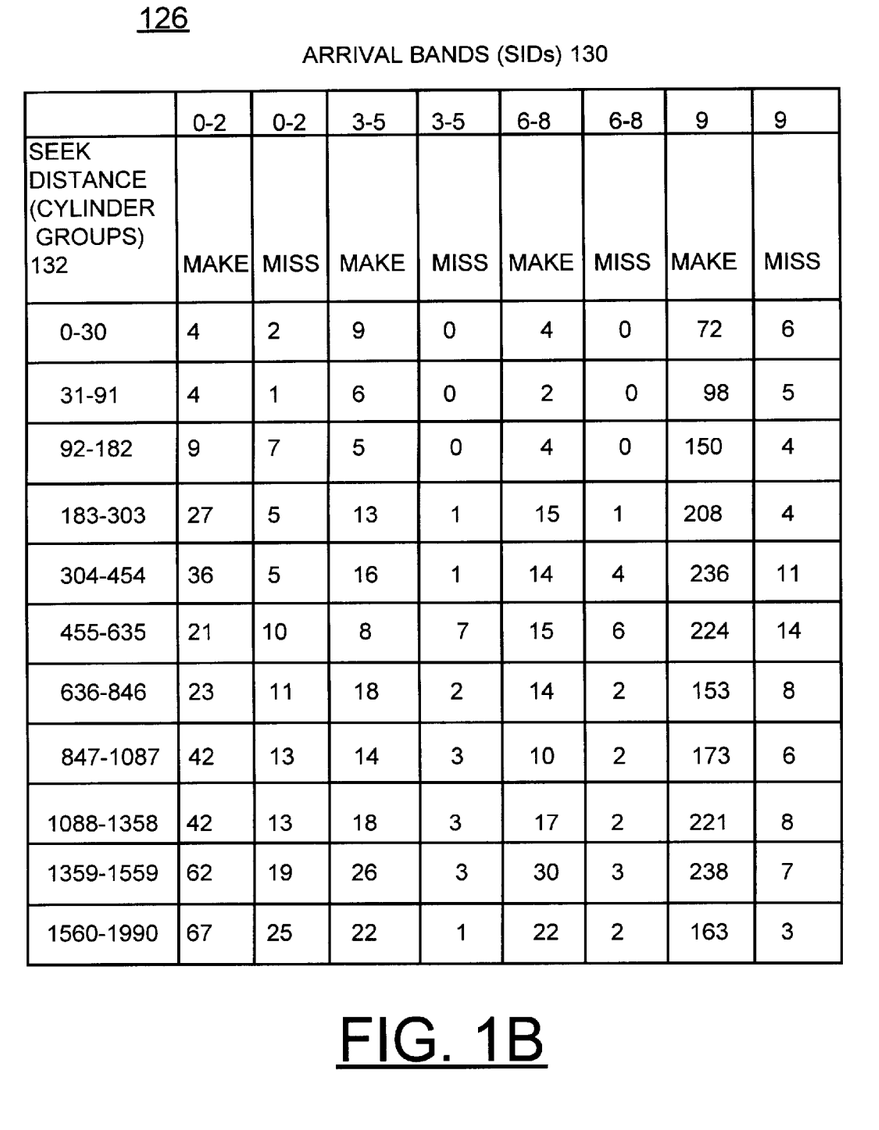
FIG. 1B is a diagram illustrating an example seek classification table for implementing hard disk drive command queue ordering in accordance with the preferred embodiment.

Referring now to FIG. 1B, there is shown an example seek classification table 126 for implementing hard disk drive command queue ordering in accordance with the preferred embodiment. When the drive's past performance history is stored and retrieved, it is classified according to the major factors that typify it. As shown in FIG. 1B, seek classification table 126 allows for memory space efficiency while maintaining expected access time accuracy. The main two dimensions used in classifying seeks are arrival bands 130 and seek distance or cylinder groups 132. Arrival bands 130 are groups of seeks that contain the same difference between the estimated seek time and the amount of time required to perform the seek. The arrival band 130 represents the difference in latency estimated to exist after the seek is complete. Cylinder groups 132 are groups of seeks that share the same seeking distance measured in cylinders. The arrival bands 130 are grouped linearly, while the cylinder groups 132 are grouped such that the same amount of rotational time is represented in each cylinder group. In other words, the groups are created in such a way that each cylinder group 132 corresponds to the same amount of seek table entries. For each entry in the arrival band 130 versus cylinder group 132 in the seek classification table 126, miss and make count values are stored. These miss and make count values are used to determine the Probability of Miss and Probability of a Make variables.

The number and size of the cylinder groups 132 and the arrival bands 130 can be varied depending on the amount of memory allotted for storing seek data. The command cost calculation becomes more accurate as the number of groups 130, 132 increases and the size of each group 130, 132 decreases. It should be understood that additional dimensions can be added to the seek classification table 126 when memory is available. For example, the additional dimensions may include head and seek direction.

Figure 1C:
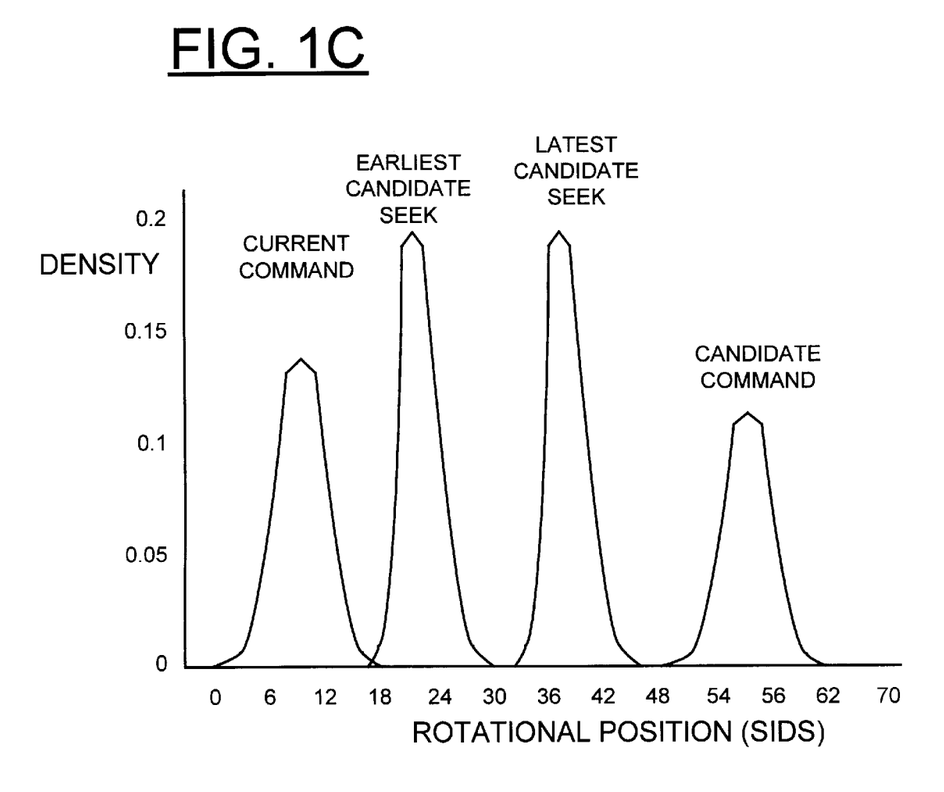
FIGS. 1C and 1D are diagrams illustrating example probability distributions for each of a currently executing command, an earliest candidate seek, a latest candidate seek and a candidate command for implementing hard disk drive command queue ordering in accordance with the preferred embodiment.

Referring now to FIG. 1C, there is shown a first example probability distribution for each of a currently executing command, an earliest candidate seek, a latest candidate seek and a candidate command for implementing hard disk drive command queue ordering in accordance with the preferred embodiment. The current command represents an estimated or calculated distribution of the location in time measured in servo samples or SIDs of the last sector accessed for the command currently being executed. The earliest candidate seek represents seek and settle distribution assuming the candidate seek is started at the first potential location of the end of the current command and the target cylinder is the one associated with the candidate command under consideration. The latest candidate seek represents seek and settle distribution assuming the candidate seek is started at a last potential location of the end of the current command. It should be noted that a plurality of identical distributions exist between the earliest and latest candidate seek distribution. The candidate command distribution represents the probability density function of the first sector of the candidate command. As illustrated in FIG. 1C, neither the earliest nor latest seek distribution overlap or straddle the candidate command distribution. Then locational uncertainty of the current and candidate command does not influence the expected access time (EAT) calculation. This is true since any assumption for current and candidate command location would lead to the same conclusion, namely, that the candidate command can be reached without spending an extra revolution. In this case, the expected access time for this candidate is equal to the mean starting location of the candidate command minus the mean ending location of the current command, represented by:

$$EAT = mean(candidate) - mean(current)$$

This scenario is essentially the same even if the candidate command is located one or more additional revolutions away. This would be the case when even the earliest current command location and seek arrival would result in a 100% chance of a miss. In this case the EAT would be the same as before, except one or more additional revolutions would be added, until there was a non-zero probability of success to the average command latency, represented by:

EAT=mean(candidate)−mean(current)+1 or more revolutions

As long as neither the earliest nor latest seek distribution overlap or straddle the candidate command distribution, this technique applies.

In accordance with features of the preferred embodiment, a SATF algorithm is implemented that evaluates the probability of successful completion in an expected access time. The SATF algorithm of the preferred embodiment solves the problem of locational uncertainty by calculating and using the probability distribution for the currently executing seek, as well as the probability distributions for each candidate seek arrival and location.

Figure 1D:
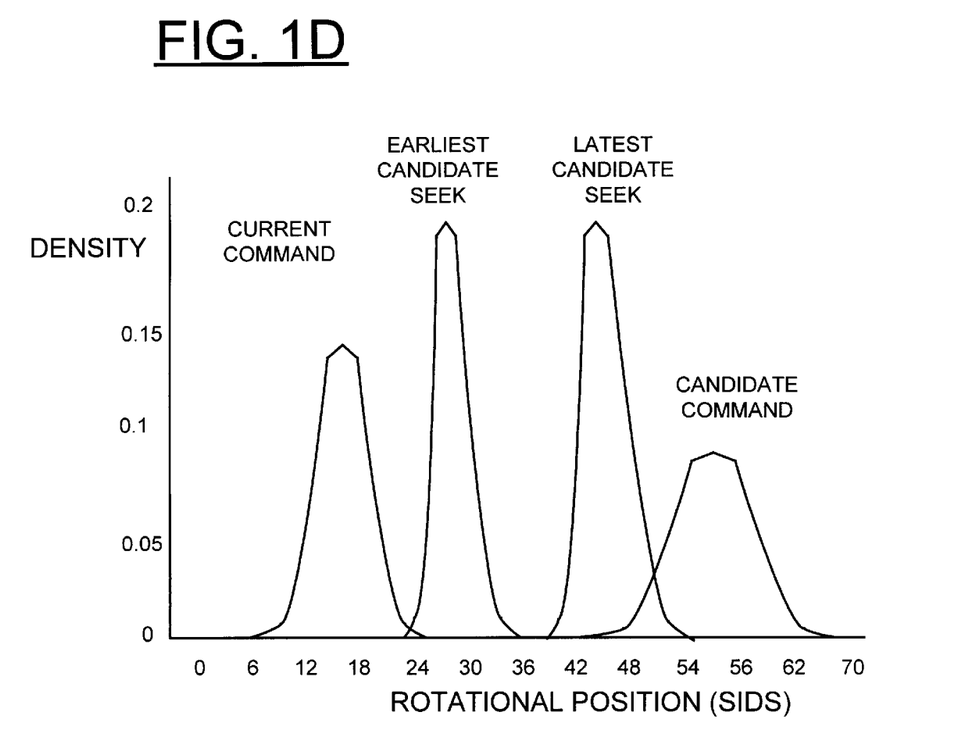

Referring now to FIG. 1D, there is shown a second example probability distribution for the currently executing command, earliest candidate seek, latest candidate seek and candidate command for implementing hard disk drive command queue ordering in accordance with the preferred embodiment. In FIG. 1D, the latest seek distribution overlaps or straddles the candidate command distribution. As illustrated in FIG. 1D, there is an area where a certain percentage of commands will result in an extra revolution being taken. One method for calculating the EAT in this case includes the following. First define a granularity N in SIDs. Then starting with the latest candidate seek, multiply this distribution by the candidate command distribution. Sum the results and multiply by the defined granularity N, this value is the probability of a miss assuming this period and assuming seek distribution and location. The result is stored in vector location R(x). While this product is greater than a set threshold T, repeat for each candidate seek between the latest and earliest candidate seek, located N SIDs prior to the last one examined. This result is stored in R(x−N) and set x=x−N. Multiply R by the current command density function, using N as the granularity, this scales the probability of a miss for each candidate seek by the probability of actually performing that seek. Then store the results in vector S. Sum the results in vector S and store in U, this now represents the cumulative probability of an extra revolution being taken given the current and candidate commands. Multiply the cumulative probability U by the number of SIDs in a revolution, the penalty for a miss, and store in Z. In this case the EAT would be represented by:

EAT=mean(candidate)−mean(current)+Z

The defined granularity N and threshold T can be used to control the processing time for each candidate in the queue. Comparing the best candidate found so far to the known best case EAT of the current command can allow for premature termination of the calculations if it is determined that the current candidate command time will be inferior. Additionally, examining the candidates in SID-sorted order also leads to additional savings, allowing premature termination of the sort once the best known candidate's EAT is less than the current latency of the candidate command being examined.

The SATF algorithm of the preferred embodiment evaluates candidates to identify a best command given each possible current command location. Upon the actual determination of the current command location, the appropriate candidate is chosen. This involves keeping a vector of Y best candidates, where Y is the size in SIDs of the current command distribution over the range larger than threshold T, divided by the granularity N. This reduces error introduced into the scheduling process. The probability of a miss is calculated and stored in a two-dimensional array as illustrated in the seek classification table 126 of FIG. 1B. The array is indexed by cylinder group and arrival band. For any given candidate command, the cylinder group is fixed based on the seek distance. The arrival band is equal to the number of extra SIDs, as defined by a binary seek profile. Extra SIDs indicate the amount of time that could be subtracted from the latency of the candidate command while still allowing for successful seek completion without the penalty of an extra revolution. For a given current command location, the earliest arrival band for the candidate command is multiplied by the probability of the candidate command at the location, using granularity N and threshold T, as described above. The result is summed for each arrival band over the candidate command interval. If during the summation, the EAT of the candidate command exceed the EAT of the best command found for that starting time, the calculations for that candidate command would be aborted. That candidate command would be removed from consideration for the remainder of the sort, resulting in substantial time saving. When the above calculations are used instead of relying on seek table data alone, queued performance is less dependent on the accuracy of the estimated seek time for each command.

The SATF algorithm of the preferred embodiment evaluates candidates using one of two equations. When the estimated seek time is expected to be less than the time of one full revolution, the following equation is used:

Expected Access Time=Estimated Seek Time+(Probability of Miss)*(Time of one Extra Revolution)*(Probability of Candidate Arrival)

When the estimated seek time is expected to be greater than the time of one full revolution, the following equation is used:

Expected Access Time=Estimated Seek Time−(Probability of a Make)*(Time of one Extra Revolution)*(Probability of Candidate Arrival)

The estimated seek time variable used is the above equations is looked up in one seek table 124 stored in memory. Each seek table 124 stores rotational time or arrival bands versus seek distance data. Two seek tables 124 are stored, one for read commands and one for write commands. When a seek distance is looked up in the table 124, a rotational time measured in servo IDs (SIDs) required to successfully perform the seek is returned. If the minimum rotational time is greater than the available rotational time, the time of one full revolution is added to the estimated seek time used in the calculation above. This type of seek table is currently used in expected access time algorithms.

Figure 2A:
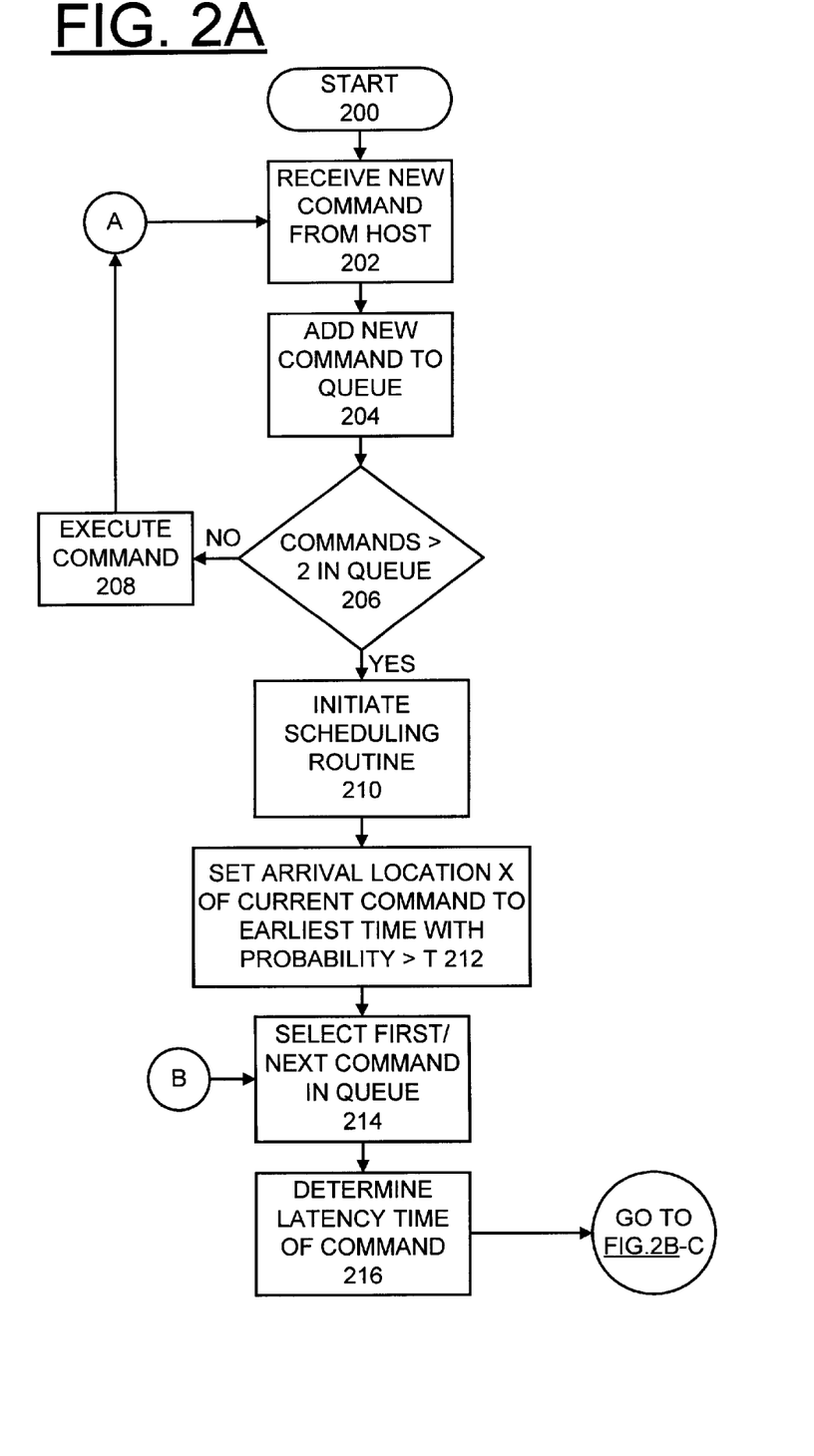
FIGS. 2A, 2B, 2C and 2D are flow charts illustrating exemplary sequential steps for implementing hard disk drive command queue ordering in accordance with the preferred embodiment.

Referring now to FIGS. 2A, 2B, 2C and 2D, there are shown exemplary sequential steps for implementing hard disk drive command queue ordering in accordance with the preferred embodiment. In FIG. 2A sequential steps start at a block 200. A new command from the host is received as indicated in a block 202. The new command from the host is added to the queue as indicated in a block 204. Checking whether more than two commands are in the queue is performed as indicated in a decision block 206. If not, then a command is executed as indicated in a block 208. Then the sequential operations return to block 202 following entry point A to receive a new command for the host.

When more than two commands are in the queue, then a scheduling routine is initiated as indicated in a block 210. An arrival location X of the current command is set to the earliest time with a probability greater than threshold T as indicated in a block 212. A first/next command in the queue is selected as indicated in a block 214. Next a latency time of the command is determined as indicated in a block 216. Then the sequential operations continue following entry point C in FIG. 2B.

Figure 2B:
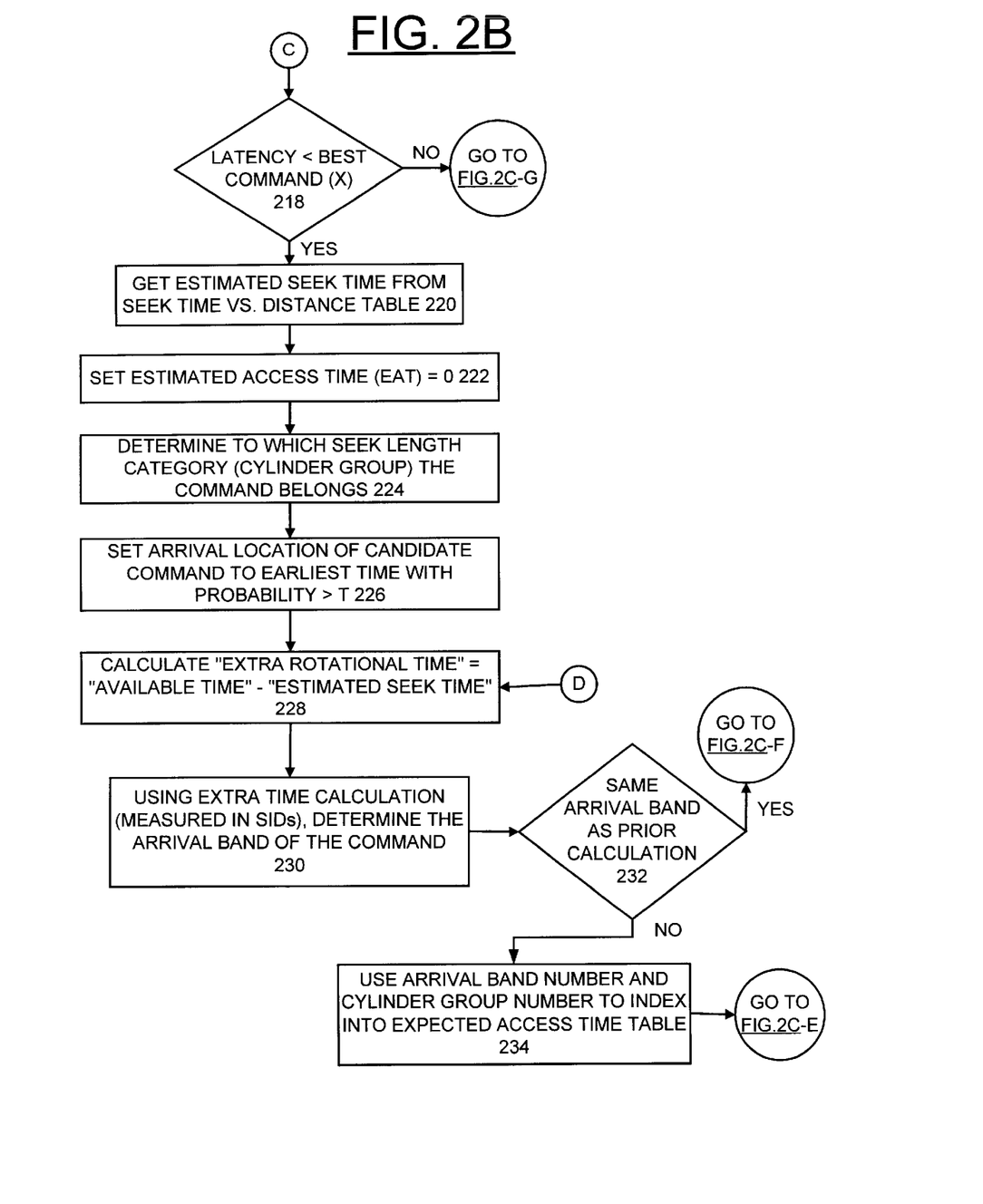

Referring to FIG. 2B, the latency is compared with a best command (X) as indicated in a decision block 218. If the latency is not less than best command (X), the sequential operations continue following entry point G in FIG. 2C to increment the arrival location of the current command by N at a block 250 and continue. An estimated seek time from a seek time versus distance table 124 is obtained as indicated in a block 220. The EAT is set zero as indicated in a block 222. Which seek length category or cylinder group of the command is determined as indicated in a block 224. An arrival location of the candidate command is set to the earliest time with a probability greater than T as indicated in a block 226. Then the extra rotational time equal to the available time minus the estimated seek time is calculated as indicated in a block 228. Using the extra time calculation measured in SIDs the arrival band 130 of the command is determined as indicated in a block 230. Checking whether the determined arrival band is the same arrival band as prior calculation is performed as indicated in a decision block 232. When the same arrival band as prior calculation is not identified, the arrival band 130 and cylinder group number 132 are used to index into expected access time table as indicated in a block 234. Then the sequential operations continue following entry point E in FIG. 2C. When the same arrival band as prior calculation is identified, then the sequential operations continue following entry point F in FIG. 2C.

Figure 2C:
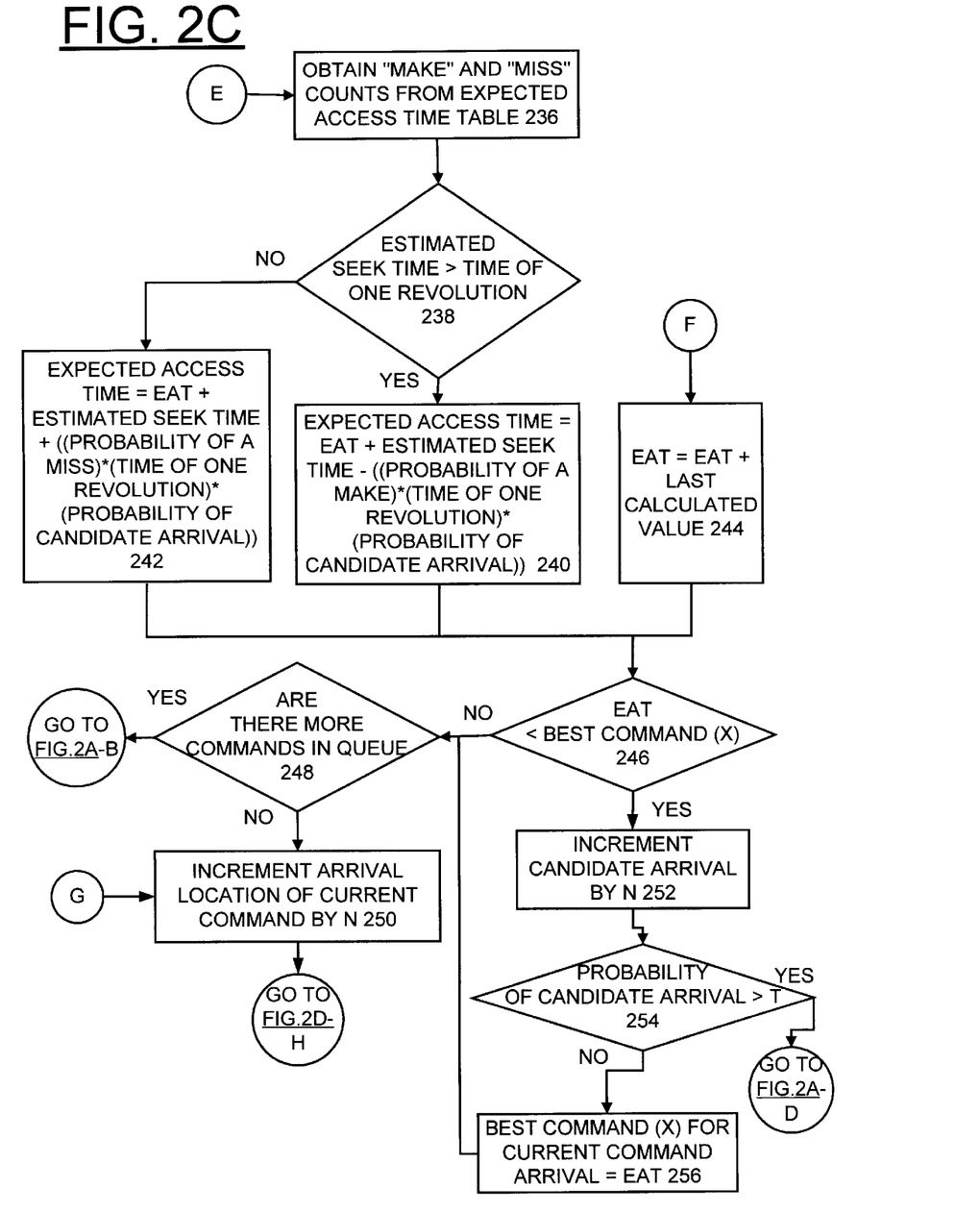

Referring to FIG. 2C, make and miss counts are obtained from expected access time table 126 as indicated in a block 236. Next checking whether the estimated seek time is greater than time of one revolution is performed as indicated in a decision block 238. When the estimated seek time is greater than time of one revolution, then the expected access time is calculated as indicated in a block 240, where the expected access time equals EAT plus the estimated seek time minus the result of the probability of a make times the time of one revolution multiplied by the probability of candidate arrival. When the estimated seek time is not greater than time of one revolution, then the expected access time is calculated as indicated in a block 242, where the expected access time equals EAT plus the estimated seek time plus the result of the probability of a miss times the time of one revolution multiplied by the probability of candidate arrival. When the same arrival band as prior calculation is identified at block 232 in FIG. 2B, then the estimated access time is set equal to the EAT plus the last calculated value as indicated in a block 244.

After the expected access time is calculated at block 240, 242 or block 244, then the expected access time is compared to the best command (X) as indicated in a decision block 246. When the expected access time is less than the best command (X), it is determined whether there are more commands in the queue as indicated in a decision block 248. When there are more commands in the queue, then the sequential operations return to block 212 in FIG. 2A following entry point B. Otherwise, when there are no more commands in the queue, then the arrival location of the current command is incremented by N as indicated in a block 250. Then the sequential operations continue in FIG. 2D following entry point H. When the expected access time is greater than or equal to the best command (X), then the arrival location of the candidate command is incremented by N as indicated in a block 252. It is determined where the probability of candidate arrival is greater than T as indicated in a decision block 254. When the probability of candidate arrival is greater than T, then the sequential operations return to block 228 in FIG. 2B, following entry point D to calculate the extra rotational time and continue. When the probability of candidate arrival is not greater than T, then the best command (X) for current command arrival is set equal to the expected access time as indicated in a block 256. Then it is determined whether there are more commands in the queue at decision block 248.

Figure 2D:
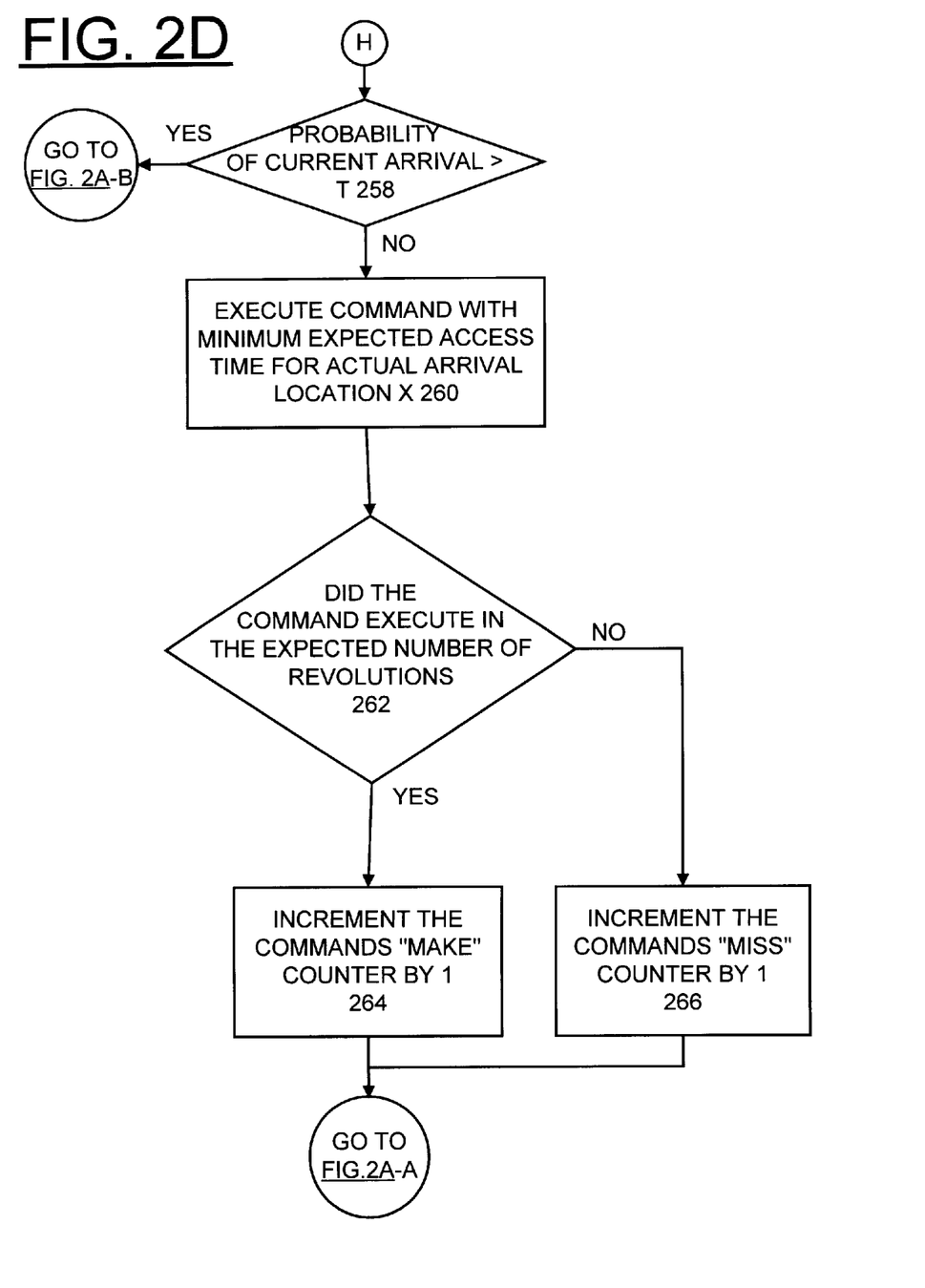

Referring to FIG. 2D following entry point H, after the arrival location of the current command is incremented by N at block 250 in FIG. 2C, then it is determined if the probability of the current arrival is greater than threshold T as indicated in a decision block 258. When the probability of the current arrival is greater than threshold T, then the sequential operations return to block 214 in FIG. 2A, following entry point B to select a next command in the queue and continue. Otherwise, the identified command with the minimum expected access time for actual arrival location X is executed as indicated in a block 260. Checking whether the command executed in the expected number of revolutions is performed as indicated in a decision block 262. When the command executed in the expected number of revolutions, the make counter is incremented by one as indicated in a block 264. When the command did not execute in the expected number of revolutions, the miss counter is incremented by one as indicated in a block 266. Then the sequential operations continue in FIG. 2A following entry point A to receive a new command from the host at block 202.

Figure 3:
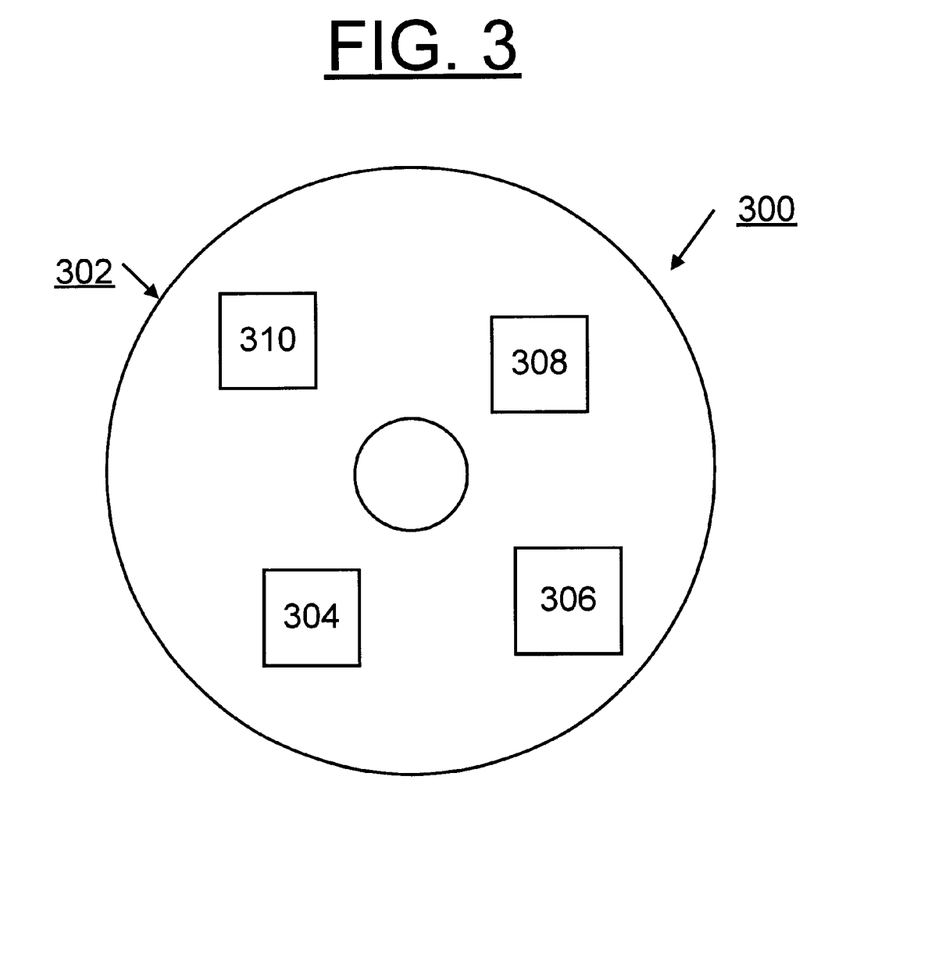
FIG. 3 is a block diagram illustrating a computer program product in accordance with the preferred embodiment.

Referring now to FIG. 3, an article of manufacture or a computer program product 300 of the invention is illustrated. The computer program product 300 includes a recording medium 302, such as, a floppy disk, a high capacity read only memory in the form of an optically read compact disk or CD-ROM, a tape, a transmission type media such as a digital or analog communications link, or a similar computer program product. Recording medium 302 stores program means 304, 306, 308, 310 on the medium 302 for carrying out the methods for implementing hard disk drive command queue ordering of the preferred embodiment in the disk file system 100 of FIG. 1A.

A sequence of program instructions or a logical assembly of one or more interrelated modules defined by the recorded program means 304, 306, 308, 310, direct the disk file system 100 for implementing hard disk drive command queue ordering of the preferred embodiment.

While the present invention has been described with reference to the details of the embodiments of the invention shown in the drawing, these details are not intended to limit the scope of the invention as claimed in the appended claims.

What is claimed is:

1. A method for hard disk drive command queue ordering with locational uncertainty of commands comprising the steps of:

for each command in said hard disk drive command queue, calculating an expected access time including a probability of success calculation; said probability of success calculation utilizing a candidate command arrival probability;

identifying a command in said hard disk drive command queue having a minimum calculated expected access time; and executing said identified command having a minimum calculated expected access time.

2. A method for hard disk drive command queue ordering as recited in claim 1 wherein the step of for each command in said hard disk drive command queue, calculating an expected access time including a probability of success calculation includes the steps of: for an estimated seek time of less than a time for one full revolution, calculating a probability of a miss multiplied by a time of one extra revolution and multiplied by said candidate command arrival probability to provide a result.

3. A method for hard disk drive command queue ordering as recited in claim 2 further includes the step of: adding said result to an estimated seek time for said command to identify said calculated expected access time.

4. A method for hard disk drive command queue ordering as recited in claim 1 wherein the step of for each command in said hard disk drive command queue, calculating an expected access time including a probability of success calculation includes the steps of: for an estimated seek time of greater than a time for one full revolution, calculating a probability of a make multiplied by a time of one extra revolution and multiplied by said candidate command arrival probability to provide a result.

5. A method for hard disk drive command queue ordering as recited in claim 4 wherein the step of for each command in said hard disk drive command queue, calculating an expected access time including a probability of success calculation includes the steps of: subtracting said result from an estimated seek time for said command to identify said calculated expected access time.

6. A method for hard disk drive command queue ordering as recited in claim 1 wherein the step of for each candidate command in said hard disk drive command queue, calculating said expected access time includes the steps of calculating a mean ending location of a currently executing command; calculating a mean starting location of each candidate command; and subtracting said mean ending location of said currently executing command from said mean starting location of each candidate command.

7. A method for hard disk drive command queue ordering as recited in claim 1 wherein the step of for each candidate command in said hard disk drive command queue, calculating said expected access time includes the steps of includes the step calculating a probability distribution for a currently executing command representing an ending location distribution for said currently executing command.

8. A method for hard disk drive command queue ordering as recited in claim 7 includes the step utilizing said probability distribution for said currently executing command for calculating said candidate command arrival probability.

9. A method for hard disk drive command queue ordering as recited in claim 1 includes the steps calculating a probability distribution for an earliest candidate seek distribution where a candidate seek is started at the first potential location of the end of said currently executing command; calculating a probability distribution for a latest candidate seek distribution where a candidate seek is started at a last potential location of the end of currently executing command; and calculating a starting location probability distribution for each said candidate command for identifying said candidate command arrival probability.

10. A computer program product for hard disk drive command queue ordering with locational uncertainty of commands in a disk drive including a processor unit, said computer program product including a plurality of computer executable instructions stored on a computer readable medium, wherein said instructions, when executed by said processor unit, cause the processor unit to perform the steps of:

for each candidate command in said hard disk drive command queue, calculating a starting location probability distribution for each said candidate command to identify a candidate command arrival probability; calculating an expected access time including a probability of success calculation utilizing said candidate command arrival probability;

identifying a command in said hard disk drive command queue having a minimum calculated expected access time; and executing said identified command having a minimum calculated expected access time.

11. A computer program product for hard disk drive command queue ordering in a disk drive as recited in claim 10 wherein said instructions, when executed by said processor unit, cause the processor unit to perform the steps of: for an estimated seek time of less than a time for one full revolution, said probability of success calculation including a calculation of a probability of a miss multiplied by a time of one extra revolution and multiplied by said candidate command arrival probability, and adding a result of said calculation to an estimated seek time for said candidate command to identify said calculated expected access time.

12. A computer program product for hard disk drive command queue ordering in a disk drive as recited in claim 10 wherein said instructions, when executed by said processor unit, cause the processor unit to perform the steps of: and for an estimated seek time of greater than a time for one full revolution, said probability of success calculation including a calculation of a probability of a make multiplied by a time of one extra revolution and multiplied by said candidate command arrival probability; subtracting a result of said calculation from an estimated seek time for said candidate command to identify said calculated expected access time.

13. A computer program product for hard disk drive command queue ordering in a disk drive as recited in claim 10 wherein said instructions, when executed by said processor unit, cause the processor unit to perform the steps of: calculating an ending location probability distribution for a currently executing command; identifying a mean ending location of said currently executing command; identifying a mean starting address of each said candidate command; and calculating said expected access time including subtracting said mean ending location of said currently executing command from said mean starting address of each said candidate command.

14. A computer program product for hard disk drive command queue ordering in a disk drive as recited in claim 10 wherein said instructions, when executed by said processor unit, cause the processor unit to perform the steps of: calculating an ending location probability distribution for a currently executing command and calculating said expected access time utilizing said ending location probability distribution for said currently executing command and said candidate command arrival probability.

15. A system for hard disk drive command queue ordering with locational uncertainty of commands comprising:

a processor;

a seek table coupled to said processor;

said processor for each command in said hard disk drive command queue, for each said candidate command; for calculating a candidate command arrival probability, and for calculating an expected access time including a probability of success calculation utilizing said candidate command arrival probability;

said processor for identifying a candidate command in said hard disk drive command queue having a minimum calculated expected access time; and said processor for executing said identified command having a minimum calculated expected access time.

16. A system for hard disk drive command queue ordering as recited in claim 15 include a seek classification table coupled to said processor; said seek classification table including a plurality of cylinder groups, each cylinder group including a plurality of arrival bands and said seek classification table storing both make and miss counters for each entry in said arrival band versus cylinder group; and wherein said processor for calculating said expected access time calculation utilizing said make and miss counters to identify an estimated seek time greater than a time of one revolution.

17. A system for hard disk drive command queue ordering as recited in claim 16 wherein said processor responsive to identifying said estimated seek time greater than a time of one revolution, for calculating said expected access time including a calculation of a probability of a make multiplied by said time of one extra revolution and multiplied by said candidate command arrival probability; and subtracting a result of said calculation from an estimated seek time for said candidate command.

18. A system for hard disk drive command queue ordering as recited in claim 16 wherein said processor responsive to identifying said estimated seek time less than or equal to a time of one revolution, for calculating said expected access time including a calculation of a probability of a miss multiplied by said time of one extra revolution and multiplied by said candidate command arrival probability; and adding a result of said calculation to an estimated seek time for said candidate command.

* * * * *